Figure 1:
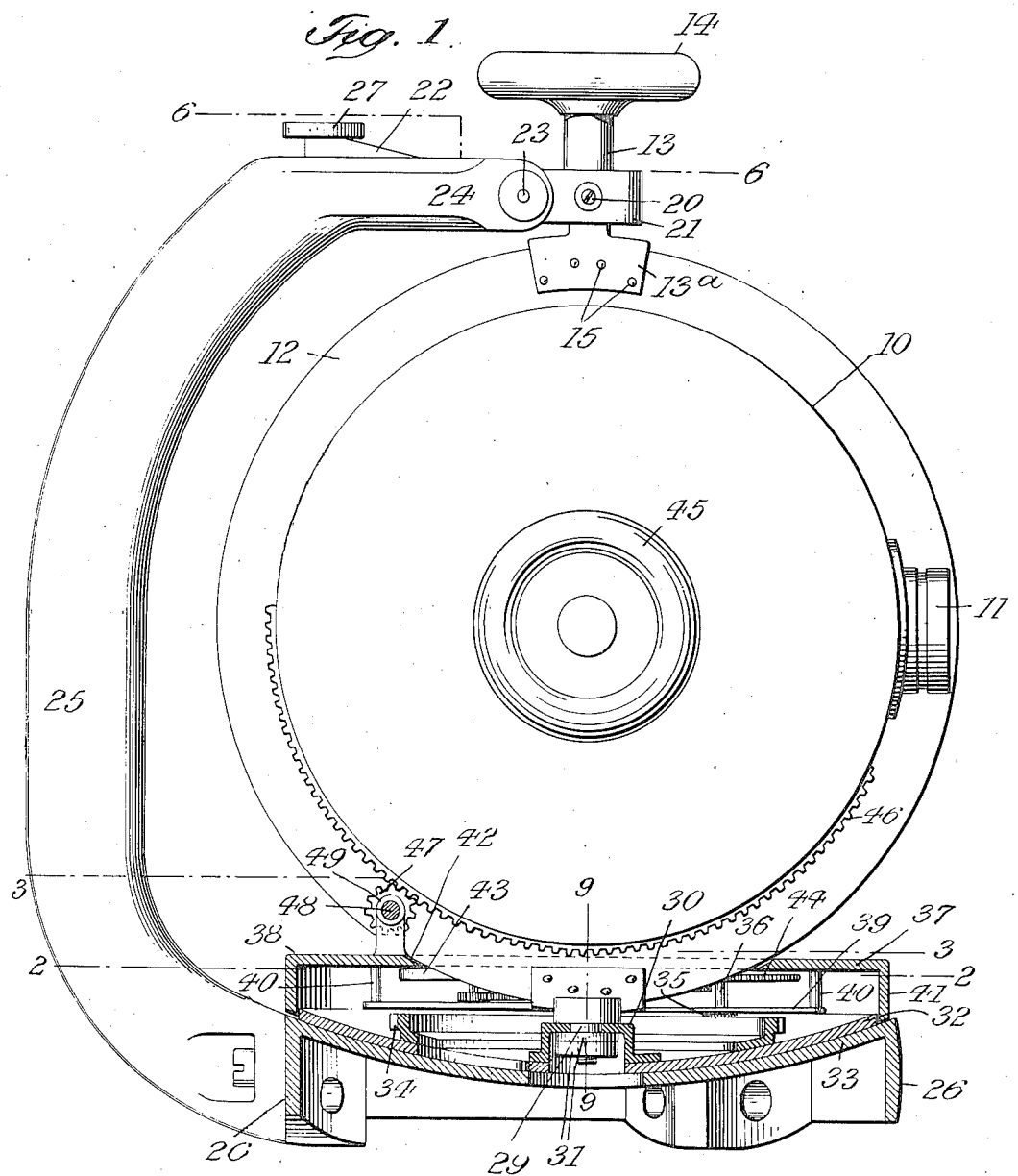

C. E. AKELEY.
MOUNTING FOR MOTION PICTURE CAMERAS.
APPLICATION FILED JUNE 5, 1915.

1,177,165.

Patented Mar. 28, 1916.
3 SHEETS—SHEET 1.

WITNESS

INVENTOR
Carl E. Akeley
BY
ATTORNEYS

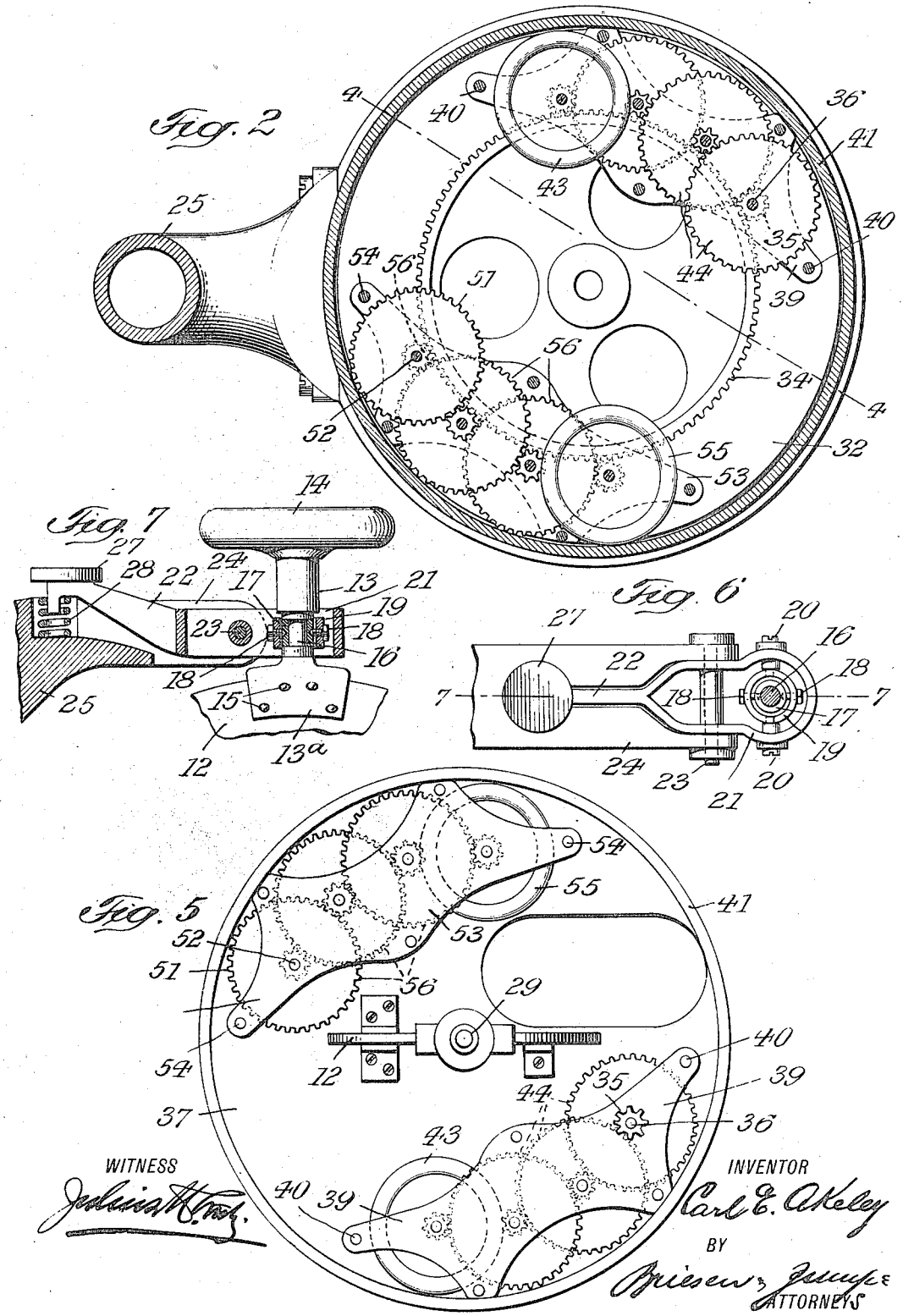

C. E. AKELEY.
MOUNTING FOR MOTION PICTURE CAMERAS.
APPLICATION FILED JUNE 5, 1915.
1,177,165.
Patented Mar. 28, 1916.
3 SHEETS—SHEET 3.
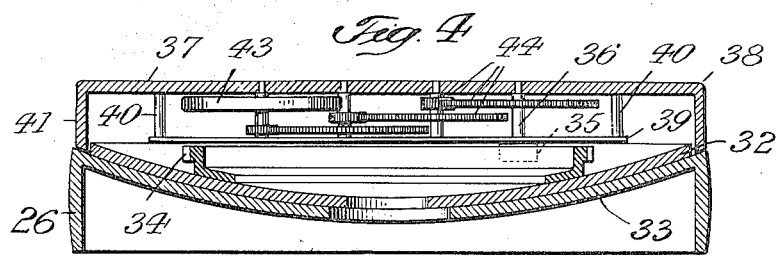
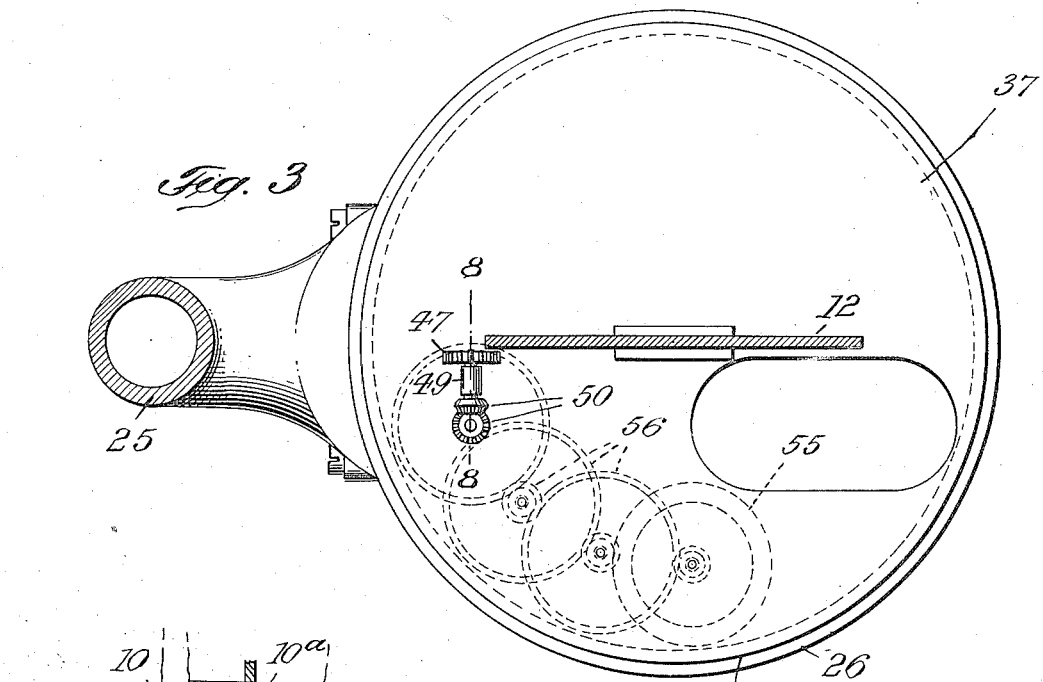
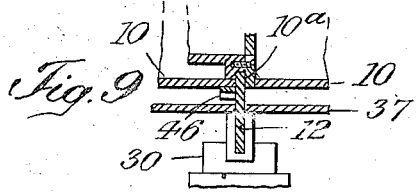
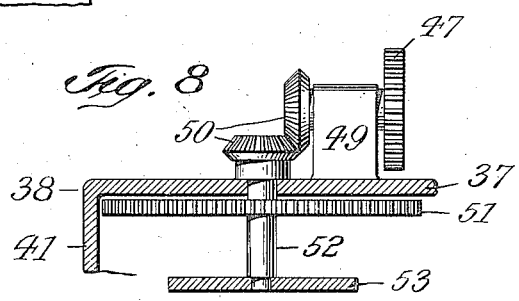
INVENTOR
Carl E. Akeley
BY
Briesen & Knauth
ATTORNEYS
WITNESS
Julius H. Fritz

UNITED STATES PATENT OFFICE.

CARL E. AKELEY, OF NEW YORK, N. Y.

MOUNTING FOR MOTION-PICTURE CAMERAS.

1,177,165.  Specification of Letters Patent.  Patented Mar. 28, 1916.

Application filed June 5, 1915. Serial No. 32,274.

*To all whom it may concern:*

Be it known that I, CARL E. AKELEY, a citizen of the United States, and a resident of New York city, county and State of New York, have invented certain new and useful Improvements in Mountings for Motion-Picture Cameras, of which the following is a specification.

This invention relates to a panoramic motion picture camera of novel construction and more particularly to novel means for mounting said camera and for regulating or steadying the speed of the camera while the same is manually rotated either in a horizontal or a vertical direction for taking corresponding panoramic pictures.

In the accompanying drawing, Figure 1 is a side view partly in section of a motion picture camera embodying my invention; Fig. 2 a horizontal cross section on line 2—2, Fig. 1; Fig. 3 a similar section on line 3—3, Fig. 1; Fig. 4 a vertical cross section on line 4—4, Fig. 2; Fig. 5 a bottom view of the speed regulating device proper; Fig. 6 a horizontal section on line 6—6, Fig. 1; Fig. 7 a vertical section on line 7—7, Fig. 6; Fig. 8 an enlarged vertical section on line 8—8, Fig. 3, and Fig. 9 a vertical section on line 9—9, Fig. 1.

My improved mounting for moving picture cameras is shown in connection with a motion picture camera of a character such as for instance illustrated in a copending patent application filed by me August 3, 1914 under Serial Number 854,777, but I desire it to be understood that my present invention may also be adapted to cameras of different constructions.

With the embodiment of my invention shown in the drawings, the cylindrical camera casing 10 having a lens tube 11 is rotatably mounted within a ring or frame 12, said frame being loosely seated within a suitably formed surface groove 10ᵃ of said casing. At its apex, frame 12 is provided with a stem 13 of a hand wheel 14 the lower flange 13ᵃ of said stem being riveted or otherwise secured to said frame as at 15. Stem 13 has a portion 16 of reduced diameter that is loosely embraced by a ring 17. At diametrically opposite points, ring 17 is engaged by screws 18 tapped into a ring 19. The latter is in turn engaged at diametrically opposite points by screws 20 tapped into the looped portion 21 of a manually operable lever 22, the common axis of screws 20 extending at right angles to the axis of screws 18. The parts 17, 18, 19, 20, 21 thus constitute a cardanic suspension for the frame 12 that in turn rotatably supports the camera casing. Lever 22 is shown to be pivoted at 23 to the bifurcated end 24 of a curved arm 25 that extends upwardly from the base 26 of a suitable camera stand, a stand of this character, being for instance shown and described in a copending patent application filed by me August 3, 1914 under Serial Number 854,775, the lever 22 being provided with a finger piece 27, while a spring 28 tends to raise the lever at the end carrying said finger piece.

Diametrically opposite the stem 13, the frame 12 is provided with a stud 29 upon which an inverted cup-shaped holder 30 is rotatably mounted, said holder being held in position by nuts or other fastening members 31. To holder 30 is firmly attached a curved plate or foot 32 adapted to engage the similarly curved or dished top or support 33 of the base 26. The opposed or contacting faces of the parts 32, 33 should be so curved as to have the center of the cardanic suspension of stem 13 for their mutual center. Thus whenever the finger piece 27 is depressed, the foot 32 is lifted off the support 33 so that the camera by being freely suspended will automatically adjust itself to its proper perpendicular position. Upon a subsequent release of the finger piece, the foot 32 will, by spring 28, be clamped to support 33 as will be readily understood.

If it is desired to take a horizontal panoramic view, the frame 12 together with the camera 10 is rotated by means of the hand wheel 14, such rotation being rendered possible owing to the rotatable mounting of stem 13 within ring 17 and that of stud 29 within holder 30. In order to steady this rotary movement of the camera, there is firmly attached to the support 33 a toothed wheel 34 which is engaged by a pinion 35. The latter is secured to an arbor 36 that is rotatably supported by the top plate 37 of a housing 38 and by a plate 39 secured to said top plate through connecting studs 40. The cylindrical wall 41 of the housing 38 loosely surrounds the foot 32 while the top plate 37 is cut out as at 42 for the accommodation of the lower portion of the frame 12, the housing 38 thus participating in the rotation of said frame. Arbor 36 is connected to a fly wheel 43 by means of a speed-increasing gear 44 located between and supported by the plates 37, 39. It will thus be seen that whenever the hand wheel 14 is rotated for taking a horizontal panoramic view, the pinion 35 is rolled about the stationary toothed wheel 34. The rotary movement thus imparted to the pinion is by speed-increasing gear 44, transmitted to the fly wheel 43 thereby steadying said rotary movement as will be readily understood, so that the production of uniform panoramic views is insured.

For rotating the camera 10 within the frame 12 in order to obtain vertical panoramic pictures, the camera casing is provided at its center with a relatively fixed hand wheel 45. To the camera casing is firmly attached a toothed segment 46 which is engaged by a pinion 47. The axle 48 of the latter is journaled in a bearing 49 of housing 38 and is by beveled gear wheels 50 operatively connected to a gear wheel 51 carried by an arbor 52 which is rotatably supported by the top plate 37 and a plate 53 secured to said top plate by connecting studs 54. Gear wheel 51 is connected to a fly wheel 55 by means of a speed-increasing gear 56 located between and supported by the plates 37, 53. It is thus evident that whenever the camera casing is rotated within ring 12 by means of the hand wheel 45, the segment 46 will impart rotary motion to the pinion 47, which motion is in turn transmitted to the fly wheel 55 through the speed-increasing gear 56. In this way any jerky movement of the camera is effectively prevented. By simultaneously rotating the camera casing within the frame 12 and the latter within the stand, both of the speed-regulating fly wheels 43, 54 will be simultaneously actuated so as to steady said rotary movements and insure the production of uniform panoramic pictures at any desired angle.

I claim:

1. A device of the character described, comprising a motion picture camera, a frame supporting the same, means for rotatably suspending said frame, a foot rotatably connected to the frame, and means for clamping said foot in position.

2. A device of the character described, comprising a motion picture camera, a frame rotatably supporting the same, means for rotatably suspending said frame, a foot rotatably connected to the frame, and means for clamping said foot in position.

3. A device of the character described, comprising a motion picture camera, a frame supporting the same, a support, an arm extending upwardly therefrom, means for rotatably suspending said frame from said arm, and a foot rotatably connected to the frame and adapted to engage the support.

4. A device of the character described, comprising a motion picture camera, a frame supporting the same, a support, an arm extending upwardly therefrom, a cardanic suspension for rotatably suspending the frame from the arm, and a foot rotatably connected to the frame and adapted to engage the support.

5. A device of the character described, comprising a motion picture camera, a frame supporting the same, means for rotatably supporting the frame, the axis of rotation of the camera relatively to the frame extending at right angles to the axis of rotation of the frame, means for steadying the rotation of the camera relatively to the frame, and means for steadying the rotation of the frame.

6. A device of the character described, comprising a motion picture camera, a frame supporting the same, means for rotatably supporting the frame, the axis of rotation of the camera relatively to the frame extending at right angles to the axis of rotation of the frame, means for steadying the rotation of the camera relatively to the frame, and independent means for steadying the rotation of the frame.

7. A device of the character described, comprising a motion picture camera, a frame supporting the same, means for rotatably supporting the frame, the axis of rotation of the camera relatively to the frame extending at right angles to the axis of rotation of the frame, a first fly wheel, a first speed-increasing gear for operatively connecting said first fly wheel to the camera, a second fly wheel, and a second speed-increasing gear for operatively connecting said second fly wheel to the frame.

8. A device of the character described, comprising a motion picture camera, a frame supporting the same, means for rotatably supporting the frame, the axis of rotation of the camera relatively to the frame extending at right angles to the axis of rotation of the frame, a housing rotatable with the frame, a first fly wheel, a first speed-increasing gear for operatively connecting said first fly wheel to the camera, a second fly wheel, and a second speed-increasing gear for operatively connecting said second fly wheel to the frame, both of said fly wheels and speed-increasing gears being accommodated within said housing.

9. A device of the character described, comprising a motion picture camera, a frame supporting the same, a support, an arm extending upwardly therefrom, means for rotatably suspending said frame from said arm, a foot rotatably connected to the frame and adapted to engage the support, a toothed segment fast on the camera, a first pinion engaging said segment, a first fly wheel, a first speed-increasing gear for operatively connecting said first pinion to said first fly wheel, a toothed wheel fast on the foot, a second pinion engaging said toothed wheel, a second fly wheel, and a second speed-increasing gear for operatively connecting said second pinion to said second fly wheel.

CARL E. AKELEY.